(12) United States Patent
Circenis et al.

(10) Patent No.: US 9,367,197 B1
(45) Date of Patent: Jun. 14, 2016

(54) DISPLAYING COMPUTER RESOURCE HIERARCHY

(75) Inventors: Edgar Circenis, Loveland, CO (US); Toran K. Kopren, Fort Collins, CO (US); Michael Kingdom, Fort Collins, CO (US)

(73) Assignee: Hewlett Packard Enterprise Development LLP, Houston, TX (US)

( * ) Notice: Subject to any disclaimer, the term of this patent is extended or adjusted under 35 U.S.C. 154(b) by 652 days.

(21) Appl. No.: 12/360,917

(22) Filed: Jan. 28, 2009

(51) Int. Cl.
*G06F 3/048* (2013.01)
*G06F 3/0481* (2013.01)
*H04L 12/24* (2006.01)

(52) U.S. Cl.
CPC ............... *G06F 3/0481* (2013.01); *H04L 41/12* (2013.01); *H04L 41/22* (2013.01)

(58) Field of Classification Search
CPC ........ G06F 3/0481; H04L 41/12; H04L 41/22
USPC .................. 715/865, 734–736, 803, 835–838, 715/841–842, 846; 709/223–224
See application file for complete search history.

(56) References Cited

U.S. PATENT DOCUMENTS

| | | | |
|---|---|---|---|
| 5,748,927 A * | 5/1998 | Stein et al. .................... 715/711 |
| 6,298,349 B1 | 10/2001 | Toyoshima et al. |
| 6,308,173 B1 | 10/2001 | Glasser et al. |
| 6,421,072 B1 | 7/2002 | Ku et al. |
| 6,990,638 B2 * | 1/2006 | Barksdale et al. ............ 715/853 |
| 7,124,375 B1 * | 10/2006 | Steele et al. .................. 715/865 |
| 7,322,010 B1 * | 1/2008 | Mikula ......................... 715/734 |
| 7,483,978 B2 * | 1/2009 | Esfahany et al. ............. 709/224 |
| 7,743,332 B2 * | 6/2010 | Clark et al. ................... 715/736 |
| 7,873,916 B1 * | 1/2011 | Chaudhri ...................... 715/823 |
| 2004/0268269 A1 * | 12/2004 | Breinberg ..................... 715/851 |
| 2005/0039142 A1 * | 2/2005 | Jalon et al. .................... 715/823 |
| 2006/0059428 A1 * | 3/2006 | Humphries et al. .......... 715/734 |
| 2006/0080465 A1 * | 4/2006 | Conzola et al. ............... 709/245 |
| 2007/0192695 A1 * | 8/2007 | Grotjohn et al. ............. 715/713 |
| 2008/0282189 A1 * | 11/2008 | Hofmann ............. G06F 17/212 715/793 |
| 2009/0210800 A1 * | 8/2009 | McCann et al. .............. 715/752 |

OTHER PUBLICATIONS

Microsoft Computer Dictionary, 2002, Microsoft Press, Fifth Edition, p. 451.*

* cited by examiner

*Primary Examiner* — Haoshian Shih
(74) *Attorney, Agent, or Firm* — International IP Law Group, PLLC (57) ABSTRACT

A hierarchy of computer resources is represented on a display using frames. Each frame is constituted by a top banner, a left sidebar, a right edge, and a bottom edge. The banner includes text identifying the resource it represents. The banner and the left sidebar have sufficient width to bear the text; the edges have insufficient width to bear the text.

20 Claims, 6 Drawing Sheets

DISPLAYING COMPUTER RESOURCE HIERARCHY

BACKGROUND OF THE INVENTION

Herein, related art is described to facilitate understanding of the invention. Related art labeled "prior art" is admitted prior art; related art not labeled "prior art" is not admitted prior art.

Managing a data center or other large computer system can be quite daunting. Such systems can include a great variety of computer resources to manage, including stand-alone computers, rack-systems, blade systems, and computer complexes that can be partitioned in a number of ways including into hard and virtual partitions. A computer can host one or more virtual machines, and resources can be grouped into shared resource domains and high-availability clusters. To administrate such a computer system involves keeping track of a large number of resources of many types and many possible relationships to each other.

BRIEF DESCRIPTION OF THE DRAWINGS

The figures depict implementations/embodiments of the invention and not the invention itself.

In the figures, referents ending in "i" or "j" refer to representations of objects, which are referred to by the same numbers, but without the "i" or "j".

DETAILED DESCRIPTION

The present invention provides a user interface that facilitates management of complex computer resource hierarchies. Computer resources are represented by respective graphical representations. Each graphical representation includes a frame and its interior. Each frame is constituted by a top banner, a left sidebar, a right edge, and a bottom edge. A top banner includes text identifying the represented resource. The top banner and the sidebar are both wide enough to bear the banner text. The right edge and the bottom edge are insufficiently wide to bear the banner text. Hierarchical relations among resources are represented by nesting frames. Whether or not it contains text, the relatively wide sidebar helps an administrator to recognize hierarchical levels, relationships and resource types (indicated by frame color), even when the top banner is out of view.

Figure 1:
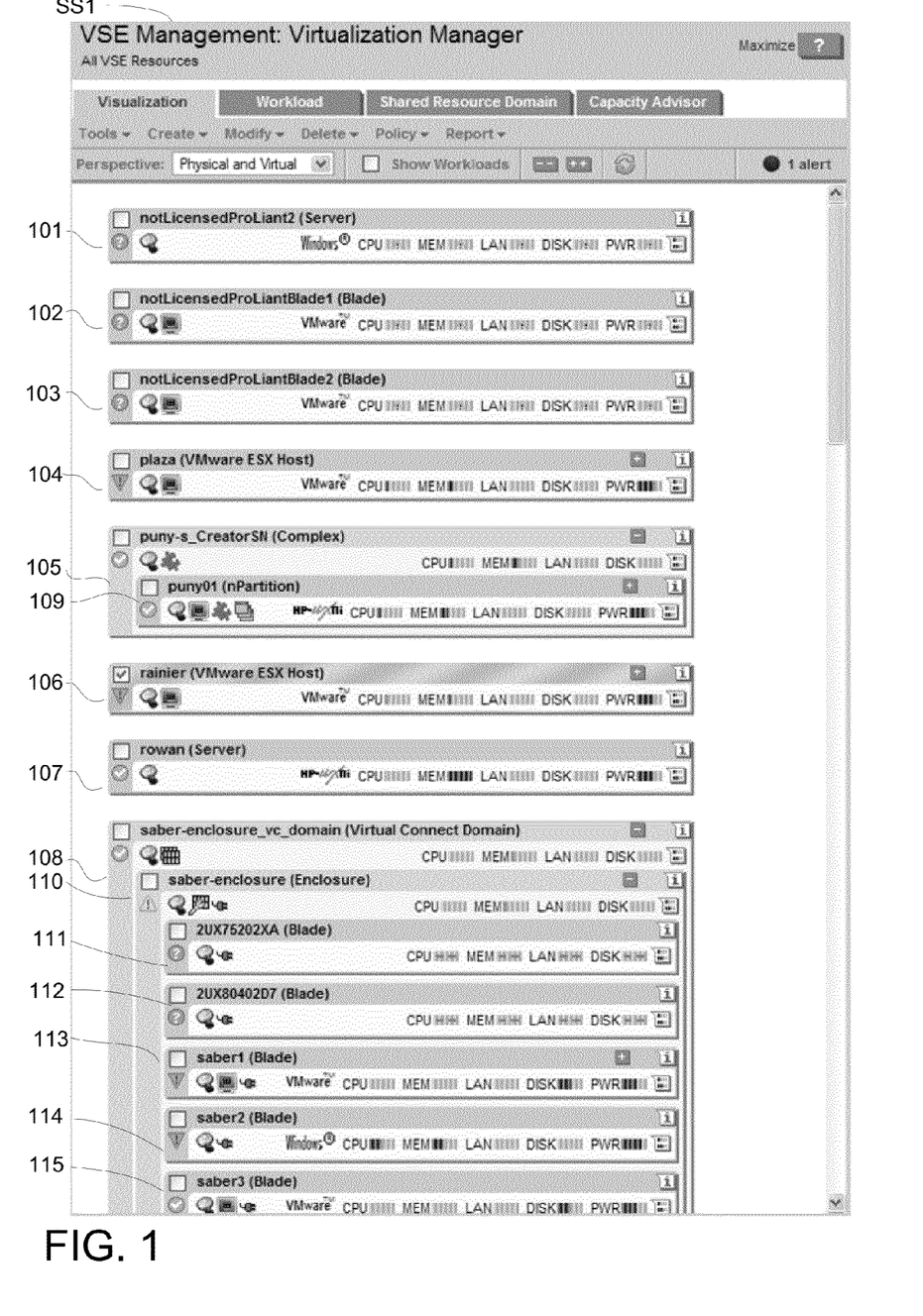
FIG. 1 is a gray-scale copy of portion of a color screen shot of a displayed graphic representation of a computer-resource hierarchy in accordance with an embodiment of the present invention.

FIG. 1 is a gray-scale copy of a portion of a screen shot of a displayed partial representation SS1. If a computer hierarchy including eight first-level representations 101-108 of computer resources. Representation 105 "contains" a second-level representation 109. Representation 108 is truncated below due to display limitations. The portion of representation 108 that is shown includes a second-level representation 110, which in turn "contains" third-level representations 111-115.

Each representation 101-115 includes a frame and a frame interior. The frames for representations 101-104, 107, 109, and 111-115 are teal in color; the frame of representation 105 and the frame of representation 110 are primrose, the frame of representation 108 is peach. In each case, the frame color is a function of an assigned resource type. For each of the foregoing frames, the interior is a lighter version of the frame color. For representation 106, the frame is using an animated series of alternating light and dark yellow bands to indicate that representation 106 is "selected"; this selection is also indicated by a check in a selection box in the upper left corner of the frame of representation 106. The frame coloring for a selected resource representation is independent of resource type. Note how the relatively wide left sidebars assist visual recognition of hierarchical relationships. The relationship provided by the invention between resources and their representations is explained in greater detail with reference to FIGS. 2-5.

Figure 2:
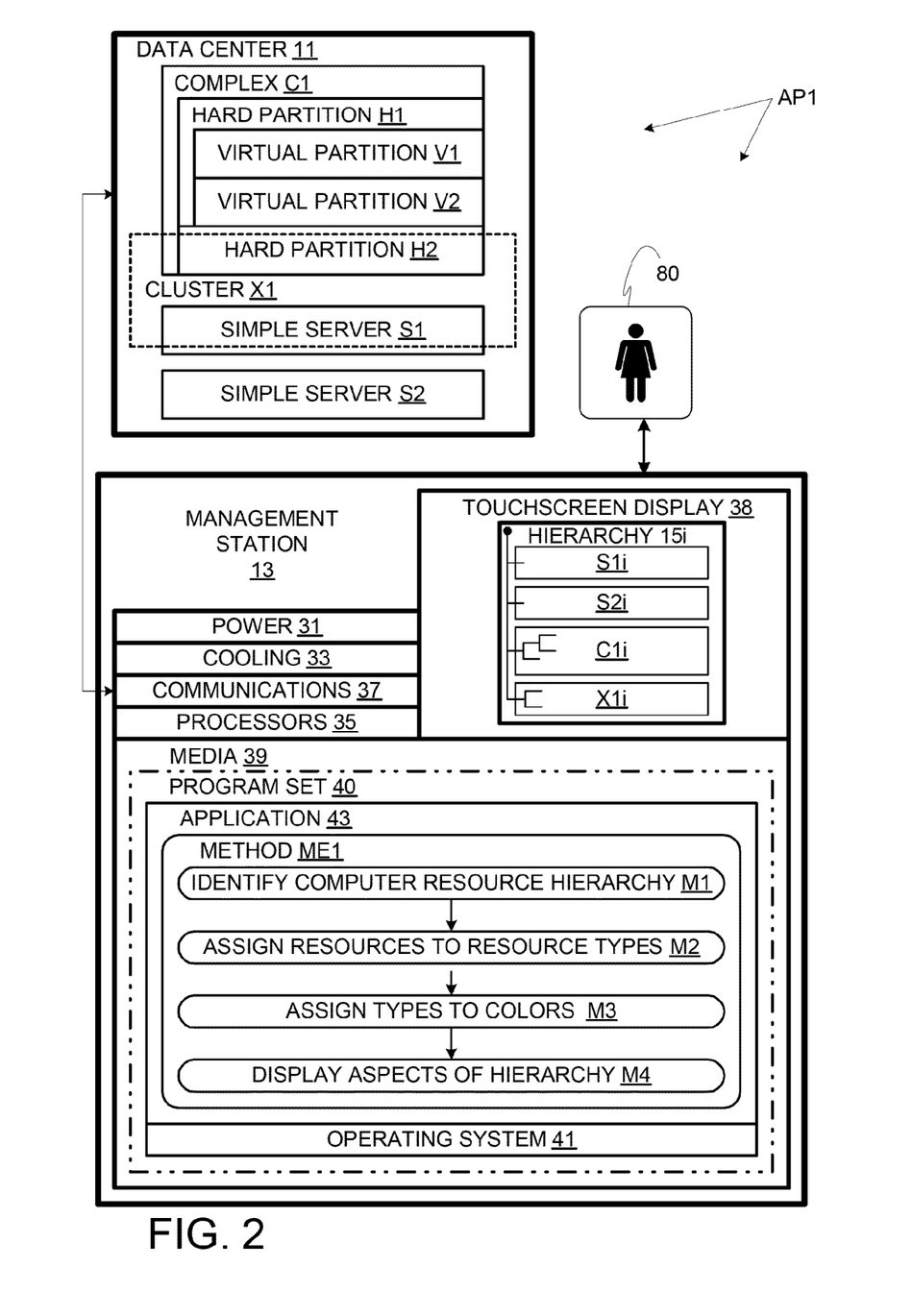
FIG. 2 is a schematic representation of a computer system including a managed data center and a management station for managing said data center in accordance with an embodiment of the invention.

FIG. 2 schematically illustrates a computer system AP1 in accordance with an embodiment of the invention. Computer system AP1 includes a data center 11 and a management station 13 for managing data center 11. Data center 11 includes simple servers S1 and S2 and a server complex C1. Server complex C1 is partitioned to define two hard partitions H1 and H2. Hard partition H1 is divided into two virtual partitions V1 and V2. Simple server S1 and hard partition H2 constitute a cluster X1 so that if either fails, the mission of the failed resource is assumed by the other, e.g., an application that was running on the failed resource is migrated to the backup resource.

Figure 3:
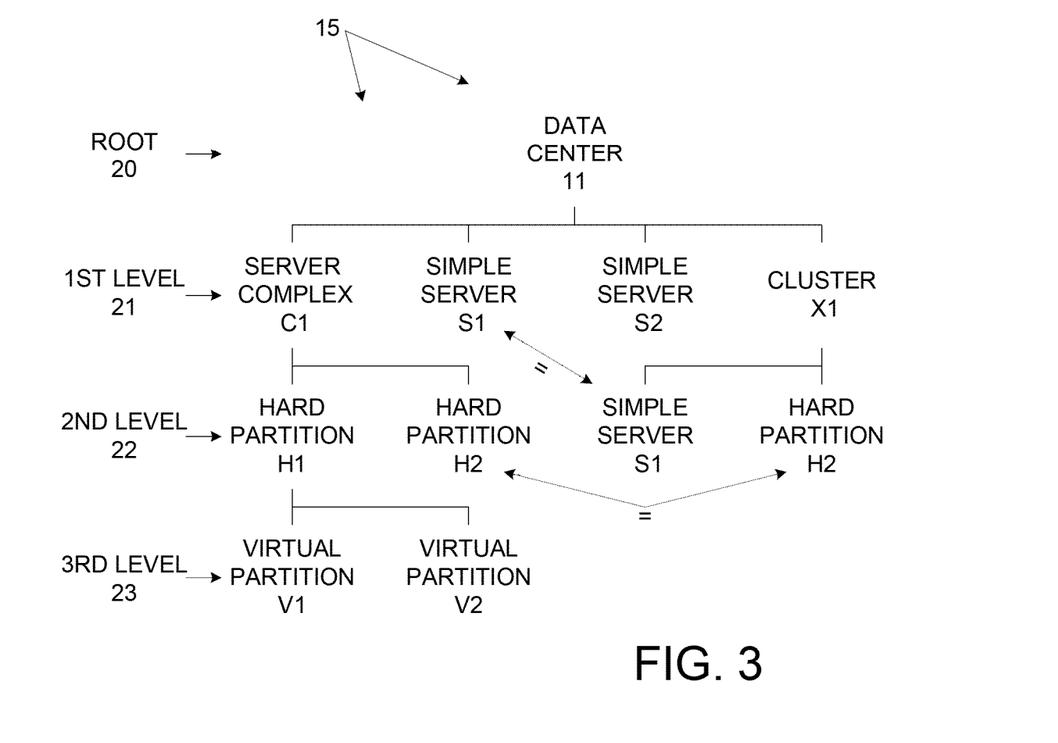
FIG. 3 is a schematic representation of a computer resource hierarchy.

Data center 11 defines a hierarchy 15, which includes a root level 20, a first level 21, a second level 22, and a third level 23, as shown in FIG. 3. Without cluster X1, data center 11 can be characterized as a simple hierarchy, e.g., one in which each resource appears only once in the hierarchy). However, in view of cluster X1, server S1 and hard partition H2 each appear twice in the hierarchy. Server S1 appears at first level 21 of hierarchy 15 and at second level 22 as part of cluster X1. Hard partition H2 appears twice at second level 22 of hierarchy 15: once within complex C1 and once within cluster X1. Since some resources appear more than once in the hierarchy, hierarchy 15 is considered "complex". This complexity is readily addressed by management station 13.

Figure 5:
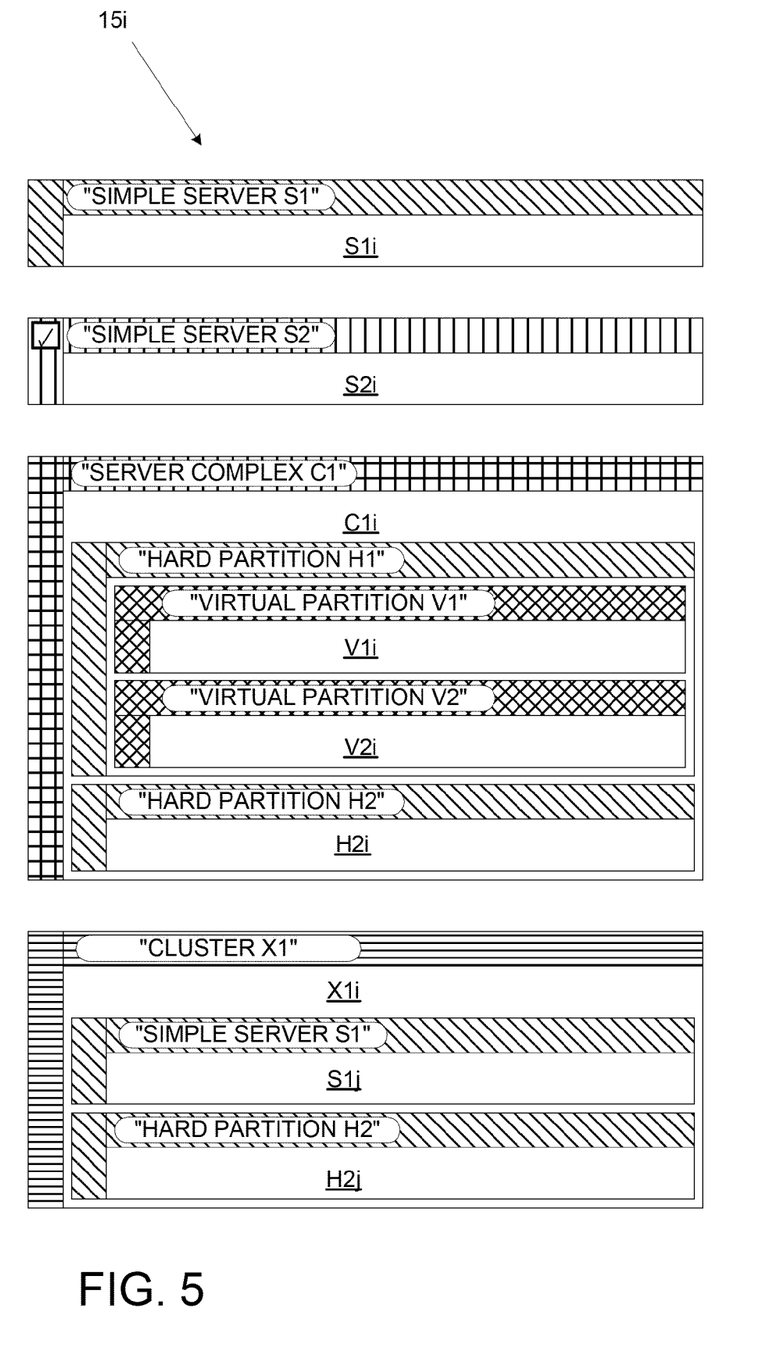
FIG. 5 is a schematic illustration of a representation of the hierarchy of FIG. 3.

Management station 13 includes a power supply 31, cooling devices 33, processors 35, communications devices 37 that control a touchscreen display 38, and computer-readable storage media 39, encoded with a set of programs 40. Program set 40 includes an operating system 41 and an application 43. Application 43 implements a method (discussed later in this specification) for displaying representations of all or part of hierarchy 15. This displaying can involve presenting a representation 15i of hierarchy 15 on display 38. As shown in FIG. 5, representation 15i includes representation S1i of server S1, representation S2i of server S2, representation C1i of complex C1, and representation X1i of cluster X1.

Figure 4:
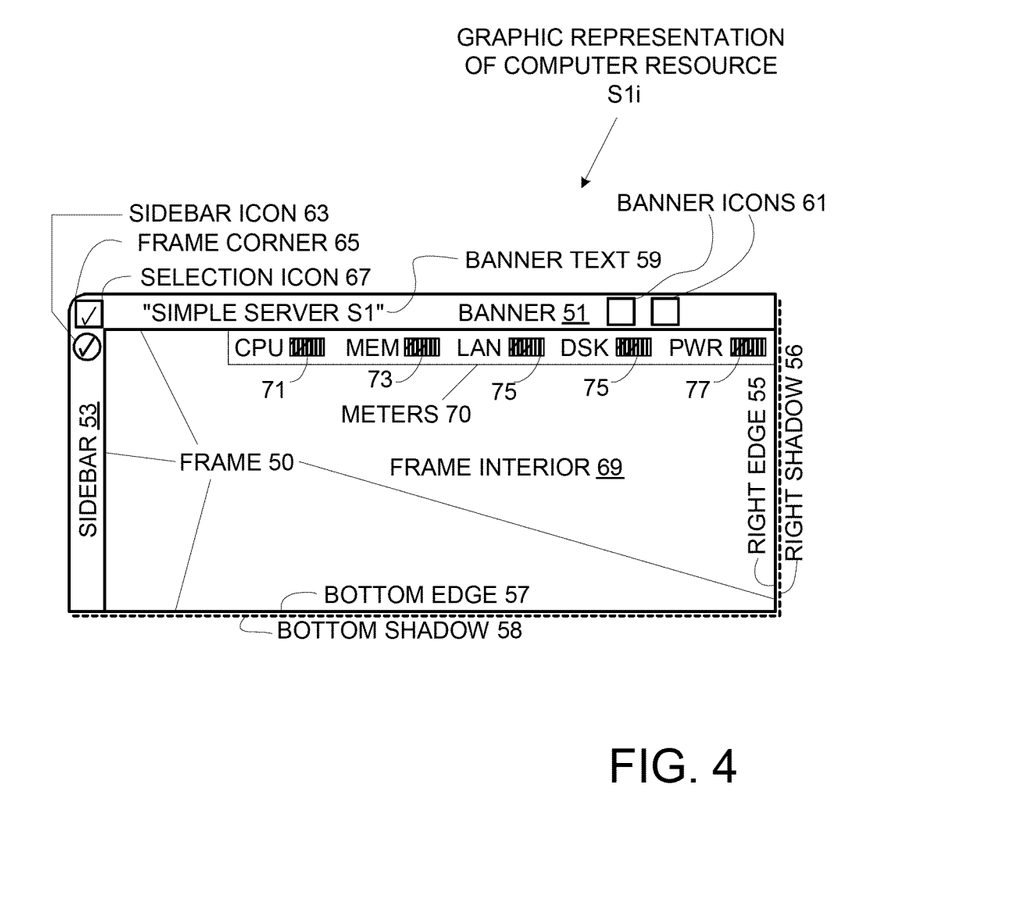
FIG. 4 is a schematic illustration of a graphical representation of a computing resource in accordance with the embodiment of FIG. 2.

Graphical representation S1i of server S1 is shown in greater detail in FIG. 4. Graphical representation S1i includes a frame 50, which in turn includes a top banner 51, a left sidebar 53, a right edge 55, and a bottom edge 57. Each of these frame components has a "length" and a "width". The length being the greater dimension for each of these components and the width being the lesser dimension for each of these components. In other words: 1) for the banner and bottom edge, the length is measured horizontally and the width is measured vertically; and 2) for the left sidebar and the right edge, the length is measured horizontally and the width is measured vertically. Banner 51 bears banner text 59 identifying the resource (in this case, server S1) and the type of resource being represented.

Accordingly, banner 51 is wide enough (vertically) to contain text of the selected font and font size. Sidebar 53 is also wide enough (horizontally) to contain text of the font and size used in the banner (whether or not sidebar 55 contains any text). In the illustrated embodiment, the widths of banner 51 and sidebar 53 are substantially the same; in an alternative embodiment, a banner and a sidebar have different widths, but both are sufficiently wide to contain banner text. In contrast, the widths of right edge 55 and bottom edge 57 are insufficient to contain the banner text. However, a right shadow 56 helps right edge 55 to stand out, and a bottom shadow 58 helps bottom edge 57 to stand out visually.

In addition to banner text 59, banner 51 can bear banner icons 61, which can be button-style controls, e.g., to access help or to "expand" and "contract" a representation to reveal or hide contents (e.g., representations of contained resources). Likewise, sidebar 53 can contain icons, such as a status icon 63 to indicate problems or lack of problems. In addition, a frame corner 65 can include a selection icon 67 to indicate whether or not representation S1*i* is currently selected, as shown for representation S1*i* in FIG. 4 and representation S2*i* in FIG. 5. As illustrated in FIG. 4, the check in the box of selection icon 67 indicates representation S1*i* is currently selected.

Representation S1*i* also includes a frame interior 69. Frame interior 69 can be used to present information not included in frame 50, such as icons for managing the represented resource, the operating system running on the resource, and performance meters. For example, frame interior 69 includes performance meters 70, including a processor (CPU) utilization meter 71, a memory (MEM) utilization meter 73, a network (LAN) utilization meter 75, a disk (DSK) utilization meter 77, and a power consumption (PWR) meter 79. Clicking on a meter or other interior or frame icon can "pop up" a relevant dialog or other expanded information view. In addition, a frame interior can contain representations of any resources contained by the represented resource; for example, the interior of representation X1*i* contains representation S1*j*, as indicated in FIG. 5.

Figure 6:
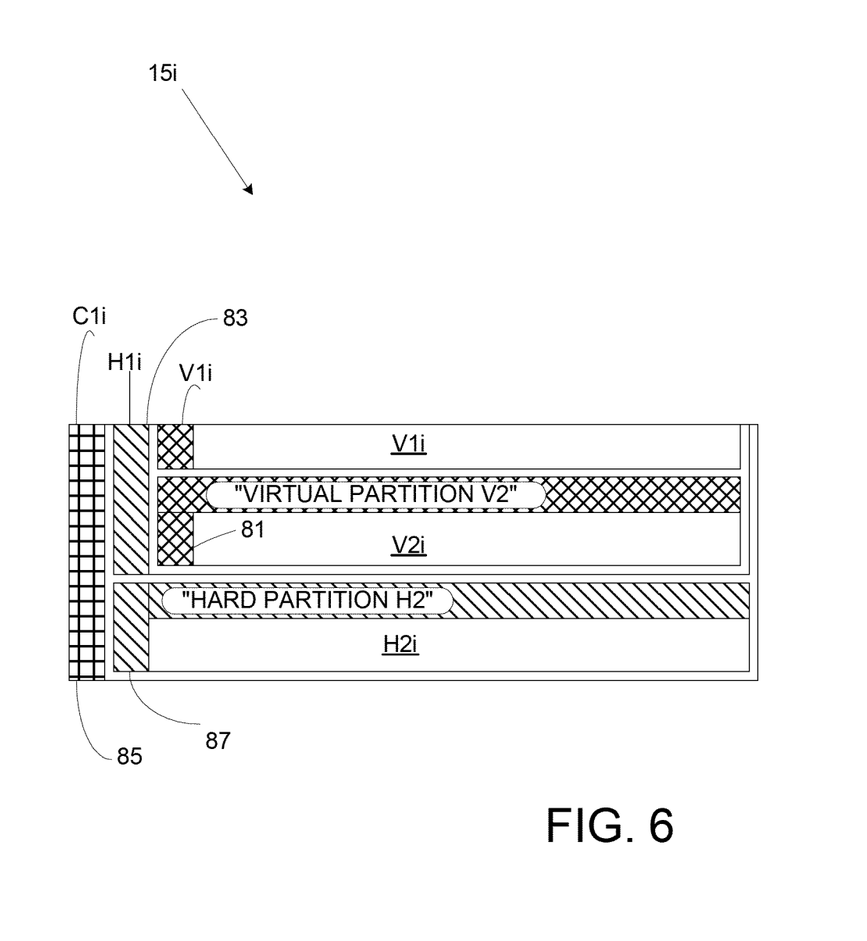
FIG. 6 is a schematic representation of a displayed portion of the graphical representation of FIG. 5.

Displayed representation 15*i* of hierarchy 15 is shown schematically in FIG. 5. Note that sidebars that are vertically separated and horizontally aligned represent resources at the same level of hierarchy 15. This can be very helpful to an administrator 80 (FIG. 2) that interacts with touchscreen display 38 to alter a configuration of a computing resource. For example, administrator 80 may zoom in on representation V2*i* to plan a reconfiguration of virtual partition V2. As a result of the zoom-in, only a portion of hierarchy representation 15*i* is displayed, as indicated in FIG. 6. Note the invention provides for displaying hierarchies in multiple columns; in that case same-level representations in the same column will be horizontally aligned but same-level representations from different columns will, of course, not be horizontally aligned.

In FIG. 6, the banners of representations C1*i*, H1*i*, and V1*i* are cut off. Thus, valuable identifying information is missing. Yet, the fact that representation V2*i* represents a virtual partition (V2) at the third level of hierarchy 15 is readily determined by examinations of sidebars. In particular, sidebar 81 of representation V2*i* is to the right of sidebar 83 of hard partition H1*i*, which is to the right of sidebar 85 of representation C1*i*. Visually "to the right" implies "contained by", so hierarchical relations are readily discerned.

The relatively wide sidebar width makes it easy to discern these hierarchical relations without having to visually trace frame features. For example, administrator 80 can readily determine that sidebar 87 of representation H2*i* is associated with a resource at the same hierarchical level as the resource represented by sidebar 83. Administrator 80 can also use frame colors, indicated by hatching in FIGS. 4 and 5, to determine the types of resources represented, even when banners are not shown.

Each displayed resource representation adopts a color scheme selected from a set of seven color schemes; in other embodiments, more or fewer color schemes can be used. Each color scheme includes a pastel frame color and an interior color, which is a lighter version of the frame color, i.e., its hue is no closer to the hue of any other frame color than it is to the hue of the associated frame color. In the illustrated embodiment, the frame colors can be roughly characterized as turquoise, pale blue, pea green, lavender, primrose, peach, and light orange. The frame colors are selected so that most viewers would be readily able to distinguish them. In addition, the frame colors are light enough so that black banner text is readily readable, but dark enough to be clearly distinguishable from the associated interior color.

Colors are assigned to resource types as follows.

Color scheme A (turquoise frame, downward diagonal hatching in FIGS. 5 and 6) is assigned to Type A resources: blade, hard partition, standalone server, cluster node, virtual-machine host.

Color scheme B (pale blue frame) is assigned to Type B resources: workload, application, resource partition.

Color scheme C (pea green frame, diamond hatching) is assigned to Type C resources: virtual machine, virtual partition.

Color scheme D (lavender, square hatching) is assigned to Type D resources: blade enclosure, complex, virtual-machine cluster.

Color scheme E (primrose) is assigned to Type E resources: virtual-connect domain group, rack.

Color scheme F (peach) is assigned to Type F resources: virtual-machine resource pool.

Color scheme G (light orange, horizontal hatching) is assigned to Type G resources: instant capacity group, cluster, virtual-machine farm, virtual machine data center, shared resource domain, virtual connect domain.

In addition, a color scheme H (animated light and dark yellow diagonal bands, vertical hatching) is used to indicated a selected resource representation, regardless of resource type. However, the interior color for the resource type is used for the frame interior.

This color system prevents or minimizes adjacent sidebars having the same color as perceived by people with normal vision (fully color sighted). In addition, this color system works well for people with forms of color blindness such as protanopia and deuteranopia. The system of color schemes works moderately well for the relatively rare tritanopia form of color blindness.

Using a lighter version of the frame color for the interior makes it very easy to find the parent container even when its information is not visible on-screen at the time. This is done by noting the parent's wide left-hand banner area color and scrolling up until the top border banner of the same color is encountered. Also, the background of the parent's content area is an indicator of the parent container and is visible at all times as it completely surrounds nested child containers.

These background colors are far more useful than, for example, alternating between two shades of gray at different levels in a hierarchy.

Thus, in method ME1 flow charted in FIG. 2 (as part of application 43), method segment M1 involves identifying a (simple or complex) hierarchy of computer resources. At method segment M2, each computing resource of the hierarchy is associated with a resource type. At method segment M3, each resource is assigned a color scheme according to the resource's type. At method segment M4, all or part of the hierarchy is displayed as taught herein, e.g., using frame dimensions and color scheme systems with suitable properties as taught herein. These and other variations upon and modifications to the illustrated embodiment are provided by the present invention, the scope of which is defined by the following claims.

What is claimed is:

1. A method comprising:
   identifying a computer-resource hierarchy of computer resources, said computer-resource hierarchy having at least first and second levels so that a first first-level computer resource contains first and second second-level computer resources; and
   using a computer, displaying frame hierarchy representing said computer-resource hierarchy in human-cognizable form on a physical display medium so that each of said computer resources that is displayed is represented at least in part by a respective frame so that a first first-level frame representing said first first-level computer resources contains first and second second-level frames respectively representing said first and second second-level computer resources, each frame being constituted by a top banner, a left sidebar, a right edge, and a bottom edge, each top banner bearing text identifying the respective resource, said top banner and said left sidebar having sufficient width to bear said text, said edges having insufficient width to bear said text so that said right edge is narrower than said left sidebar, each frame having a selection icon for a user to select the frame, wherein said displaying involves displaying said first and second second-level frames so that they are vertically distributed on said display medium and so that their respective sidebars are horizontally aligned with each other, wherein the left sidebar of the first first-level frame is continuous vertically adjacent both the first and second second-level frames with respect to the first first-level frame containing both the first and second second-level frames, wherein said displaying involves displaying a frame interior associated with each frame, each frame interior comprising a performance meter of the respective computer resource represented by the frame.

2. A method as recited in claim 1 wherein said displaying involves displaying:
   a second first-level frame representing a second first-level computer resource; and
   a third second-level frame representing a third second-level computer resource, said third second-level frame being disposed within said second first-level frame, the sidebars of said first and third second-level frames being horizontally aligned with each other and disposed respectively to the rights of the sidebars of said first and second first-level frames, and wherein a color of each frame is a function of a type of the computer resource represented by the frame, and wherein the color of the frame changes in response to the selection of the frame by a user via the selection icon, the changed color independent of the type of the computing resource represented by the frame.

3. A method as recited in claim 1 further comprising: assigning said resources to resource types and assigning each of said types to respective colors, each of said frames having the assigned color for the resource type of the resource represented by the frame so that frames of different colors correspond to resources of different types and so that adjacent ones of said sidebars have different colors, each of said different colors have a respective hue so that adjacent ones of said sidebars have different hues, and wherein said displaying comprises displaying each frame having a frame corner portion including the selection icon for a user to select the frame.

4. A method as recited in claim 1 wherein each of said frames has an interior of a lighter version of the color of the respective frame, wherein the right edge comprises a right shadow to promote visibility of the right edge, and wherein the bottom edge comprises a bottom shadow to promote visibility of the bottom edge.

5. A system comprising:
   a processor, communications devices, a display, and non-transitory computer-readable storage media, said media being encoded with an application program of computer-executable instructions, said program providing for:
   identifying a computer-resource hierarchy of computer resources, said computer-resource hierarchy having at least first and second levels so that a first first-level computer resource contains first and second second-level computer resources; and
   displaying on said display a frame hierarchy corresponding to said computer-resource hierarchy in human-cognizable form so that each of said resources that is displayed is represented at least in part by a respective frame so that a first first-level frame representing said first first-level computer resources contains first and second second-level frames respectively representing said first and second second-level computer resources, each frame being constituted by a top banner, a left sidebar, a right edge, and a bottom edge, each top banner bearing text identifying the respective resource, said top banner and said left sidebar having sufficient width to bear said text, said edges having insufficient width to bear said text so that said right edge is narrower than said left sidebar, each frame having a selection icon for a user to select the frame, wherein said displaying involves displaying said first and second second-level frames so that they are vertically distributed on said display medium and so that their respective sidebars are vertically separated from and horizontally aligned with each other, wherein the left sidebar of the first first-level frame is continuous vertically adjacent both the first and second second-level frames with respect to the first first-level frame containing both the first and second second-level frames, wherein said displaying involves displaying a frame interior associated with each frame, each frame interior comprising a performance meter of the respective computer resource represented by the frame.

6. A system as recited in claim 5 wherein said displaying involves displaying:
   a second first-level frame representing a second first-level computer resource; and
   a third second-level frame representing a third second-level computer resource, said third second-level frame being disposed within said second first-level frame, the sidebars of said first and third second-level frames being horizontally aligned with each other and disposed respectively to the rights of the sidebars of said first and second first-level frames, and wherein a color of each frame is a function of a type of the computer resource represented by the frame, and wherein the color changes in response to the frame selected via the selection icon, the changed color independent of the type of the computing resource represented by the frame.

7. A system as recited in claim 6 wherein said program provides for assigning said resources to resource types and assigning each of said types to a respective color, each of said frames having the assigned color for the resource type of the resource represented by the frame so that frames of different colors correspond to resources of different types and so that adjacent ones of said sidebars have different colors, each of said different colors have a respective hue so that adjacent ones of said sidebars have different hues, and wherein said displaying comprises displaying each frame having a frame corner portion including the selection icon for a user to select the frame.

8. A system as recited in claim 6 wherein each of said frames has an interior color that is a lighter version of the frame color, wherein the right edge comprises a right shadow to promote visibility of the right edge, and wherein the bottom edge comprises a bottom shadow to promote visibility of the bottom edge.

9. A manufacture comprising non-transitory computer-readable storage media encoded with a program set of computer-executable instructions, said program set providing for:

identifying a computer-resource hierarchy of computer resources, said computer-resource hierarchy having at least first and second levels so that a first first-level computer resource contains first and second second-level computer resources; and displaying on a physical display a frame hierarchy representing said hierarchy in human-cognizable form so that each of said resources that is displayed is represented at least in part by a respective frame so that a first first-level frame representing said first first-level computer resources contains first and second second-level frames respectively representing said first and second second-level computer resources, each frame being constituted by a top banner, a left sidebar, a right edge, and a bottom edge, each top banner bearing text identifying the respective resource, said top banner and said left sidebar having sufficient width to bear said text, said edges having insufficient width to bear said text so that said right edge is narrower than said left sidebar, each frame having a selection icon for a user to select the frame, wherein said displaying involves displaying said first and second second-level frames so that they are vertically distributed on said display medium and so that their respective sidebars are horizontally aligned with each other, wherein the left sidebar of the first first-level frame is continuous vertically adjacent both the first and second second-level frames with respect to the first first-level frame containing both the first and second second-level frames, wherein said displaying involves displaying a frame interior associated with each frame, each frame interior comprising a performance meter of the computer resource represented by the frame.

10. A manufacture as recited in claim 9 wherein said displaying involves displaying:

a second first-level frame representing a second first-level computer resource; and a third second-level frame representing a third second-level computer resource, said third second-level frame being disposed within said second first-level frame, the sidebars of said first and third second-level frames being horizontally aligned with each other and disposed respectively to the rights of the sidebars of said first and second first-level frames, and wherein a color of each frame is a function of a type of the computer resource represented by the frame, and wherein the color changes in response to a user selecting the frame via the selection icon, the changed color independent of the type of the computing resource represented by the frame.

11. A manufacture as recited in claim 9 wherein said program set provides for assigning said resources to resource types and assigning each of said types to a respective color, each of said frames having the assigned color for the resource type of the resource represented by the frame so that frames of different colors correspond to resources of different types and so that adjacent ones of said sidebars have different colors, each of said different colors have a respective hue so that adjacent ones of said sidebars have different hues, and wherein said displaying comprises displaying each frame having a frame corner portion including the selection icon for a user to select the frame.

12. A manufacture as recited in claim 9 wherein each of said frames has an interior color that is a lighter version of a color of the frame, wherein the right edge comprises a right shadow to promote visibility of the right edge, and wherein the bottom edge comprises a bottom shadow to promote visibility of the bottom edge.

13. A manufacture as recited in claim 9 wherein each of said frames includes the left sidebar that does not include text, and wherein the performance meter comprises a processor utilization meter.

14. A system as recited in claim 5 wherein each of said frames includes the left sidebar that does not include text, and wherein the performance meter comprises a processor utilization meter.

15. A method as recited in claim 1 wherein each of said frames includes the left sidebar that does not include text, and wherein the performance meter comprises a processor utilization meter.

16. A method as recited in claim 1, wherein each frame interior comprises information not on the frame, the information for managing the computer resource represented by the frame, and the information comprising the performance meter, wherein the performance meter comprises a memory utilization meter.

17. A system as recited in claim 5, wherein each frame interior comprises information not on the frame, the information for managing the computer resource represented by the frame, and the information comprising the performance meter, wherein the performance meter comprises a memory utilization meter.

18. A manufacture as recited in claim 9, wherein each frame interior comprises information not on the frame, the information for managing the computer resource represented by the frame, and the information comprising the performance meter, wherein the performance meter comprises a memory utilization meter.

19. A method as recited in claim 1 wherein a user clicking on the performance meter pops up an expanded information view.

20. A system as recited in claim 5 wherein a user clicking on the performance meter pops up an expanded information view.

* * * * *